Dec. 7, 1948.   I. C. JENNINGS   2,455,678
POWER TRANSMISSION
Filed Feb. 4, 1944   4 Sheets-Sheet 1
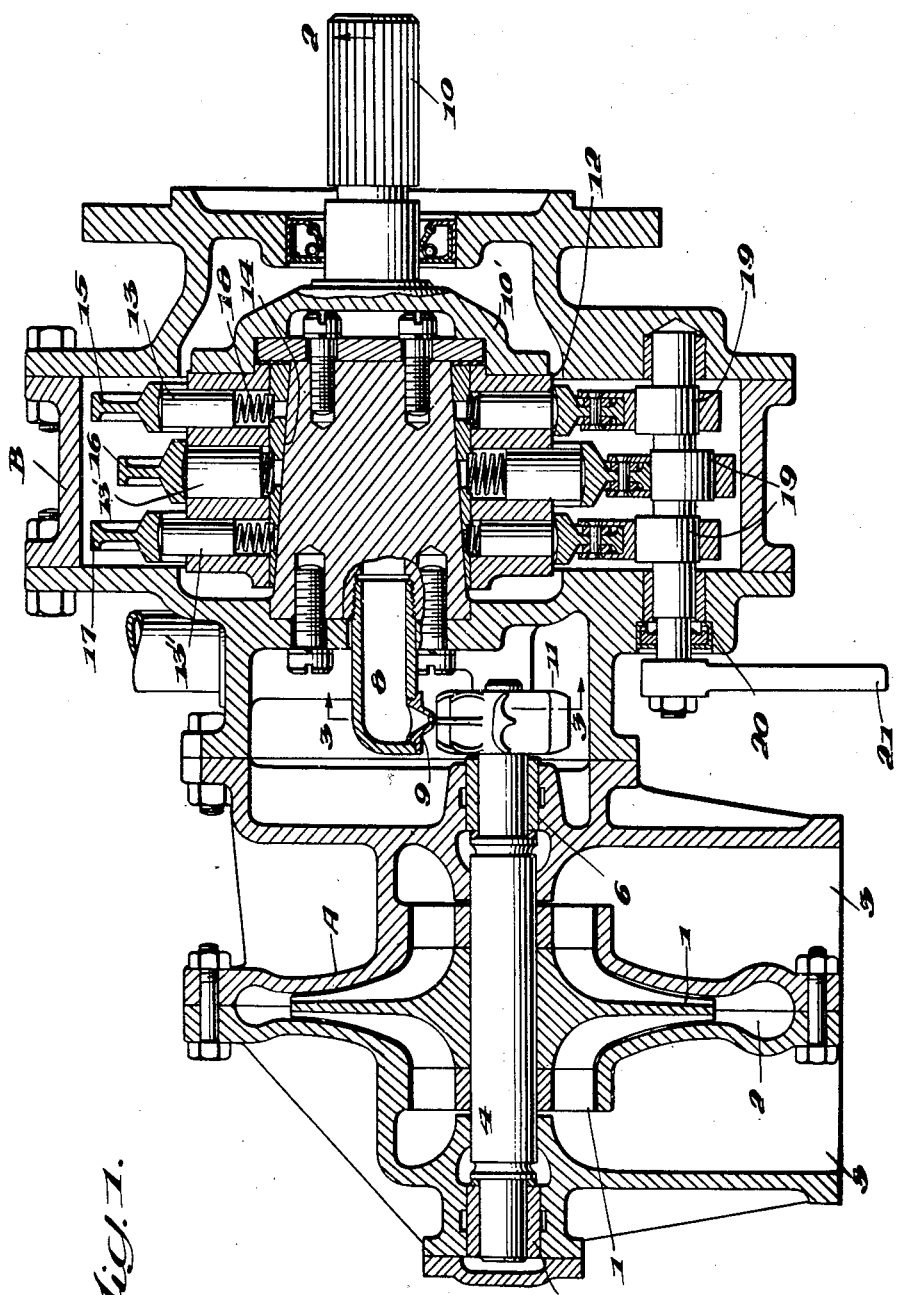
Inventor
IRVING C. JENNINGS,
By Chas. E. Riordan
Attorney

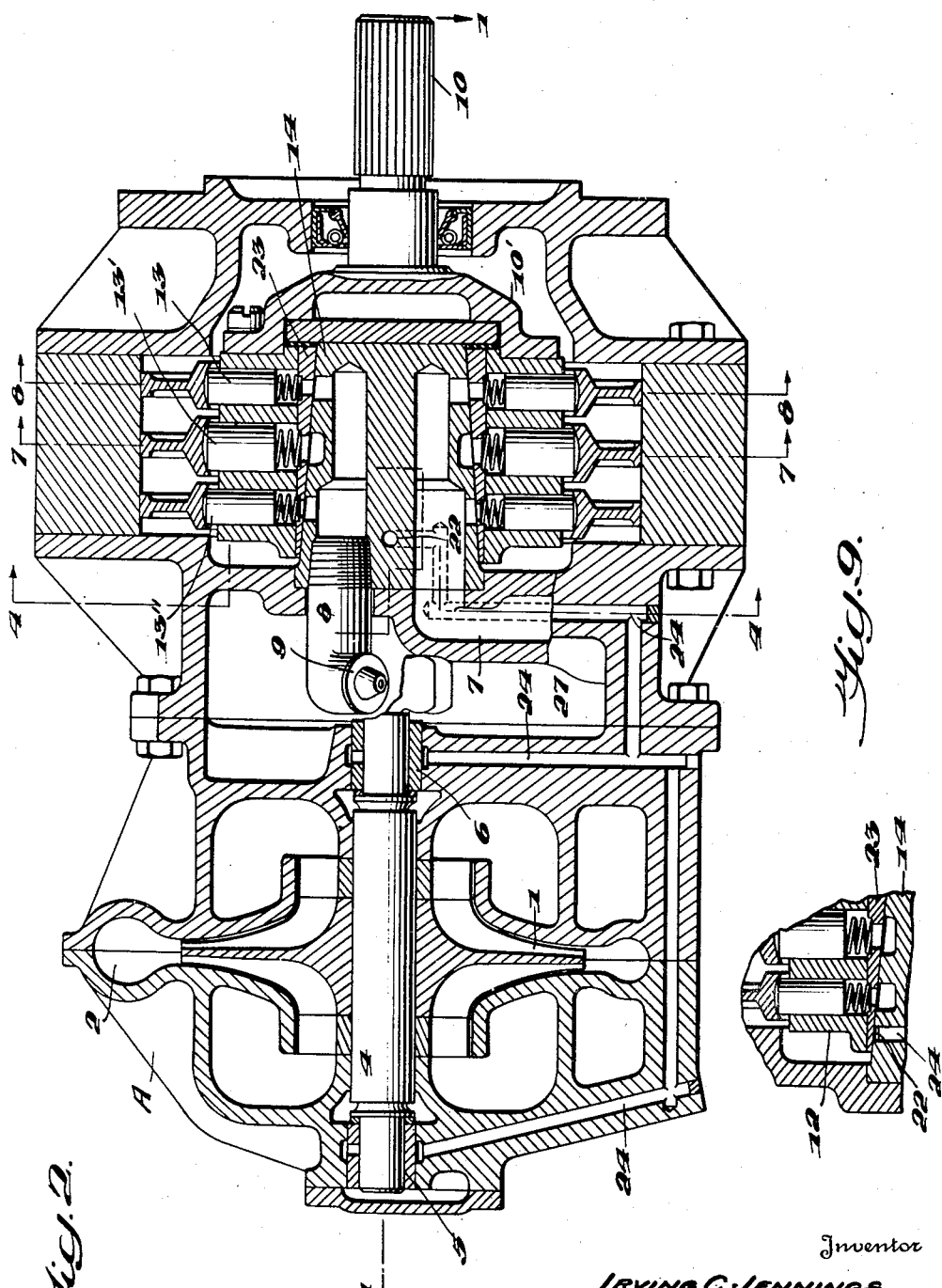

Dec. 7, 1948.     I. C. JENNINGS     2,455,678
POWER TRANSMISSION
Filed Feb. 4, 1944     4 Sheets-Sheet 3
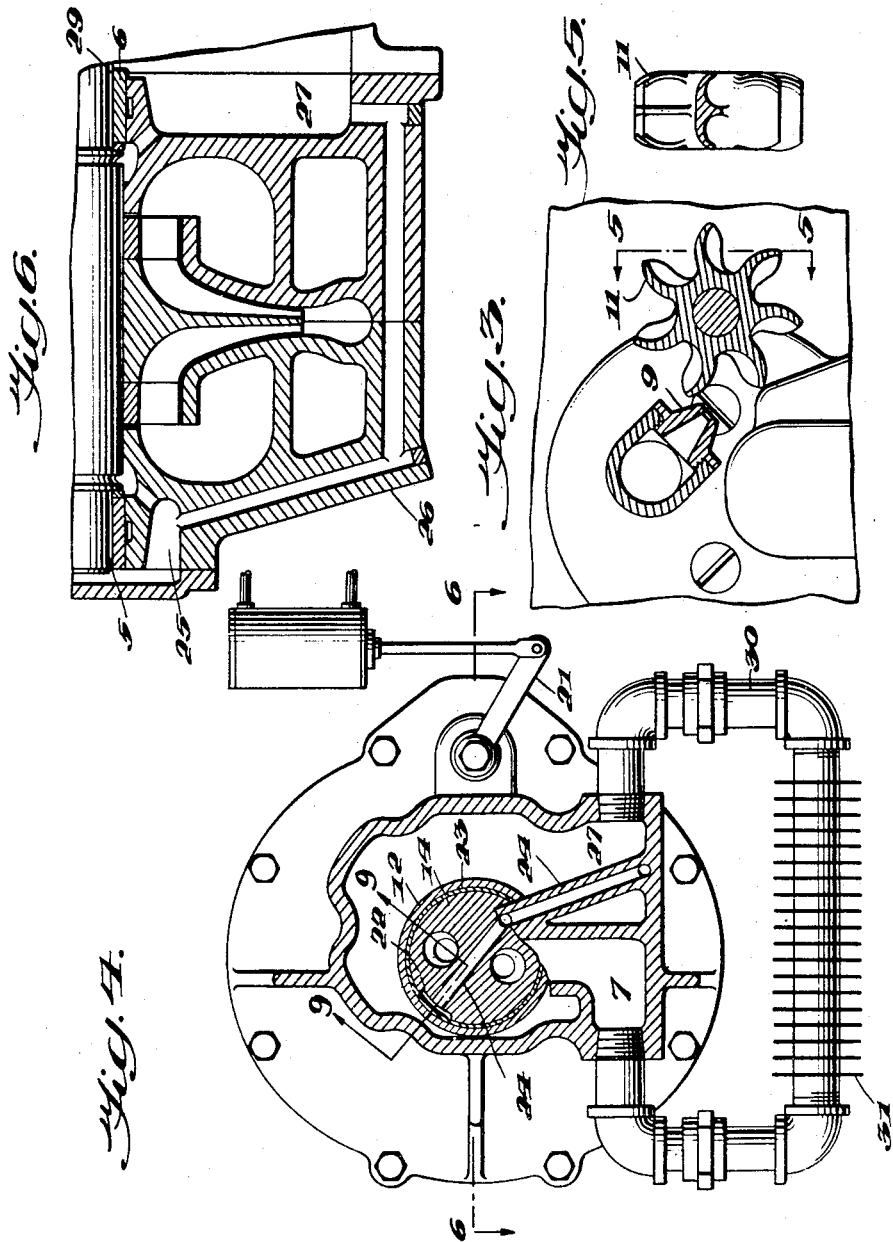
Inventor
IRVING C. JENNINGS,
By Chas. E. Riordon
Attorney Dec. 7, 1948.  I. C. JENNINGS  2,455,678
POWER TRANSMISSION
Filed Feb. 4, 1944  4 Sheets-Sheet 4

Inventor
IRVING C. JENNINGS,
By Chas. E. Riordon
Attorney

Patented Dec. 7, 1948

2,455,678

UNITED STATES PATENT OFFICE 2,455,678

POWER TRANSMISSION

Irving C. Jennings, South Norwalk, Conn.

Application February 4, 1944, Serial No. 521,065

8 Claims. (Cl. 230—11)

This invention relates to improvements in apparatus for transmitting power and is particularly useful where high rotating speed and speed control are required. An example of such an application is a high speed centrifugal type compressor, which has been found to be the most efficient and simplest means of compressing air for such service as supercharging airplane cabins or internal combustion engines for use on an airplane, where lightness and compactness are of prime importance.

It is the usual practice to drive these compressors from the main engine or from an electric motor. In either case the prime mover of necessity runs at moderate speeds. This has required the use of step-up gearing, with a more or less complicated arrangement to change the speed of the compressor to take care of the different altitude conditions and of wide fluctuation in the prime mover driving the compressor.

Gears are more or less necessary and commonly used in present day apparatus and gears are subject to great shock when operated at excessive speeds. Also, when the prime mover starts, the acceleration of the high speed end of the machinery is so rapid that very heavy stresses are impressed on the gear train, shaft, and other related parts. Great accuracy has to be maintained in cutting such gears, and the shafts supporting them have to be kept in very close parallel alignment. Ball bearings are usually used to support the shaft so that this alignment may be maintained. Gears, bearings, and other rotating parts are short-lived under these conditions. The speed at which this form of drive is being commercially operated has now nearly reached a practical limit. This speed is considerably below that required to obtain the best results from these centrifugal compressors.

The present invention comprises a new and extremely simple drive which makes possible much higher rotative speeds with reliability and long life of the various parts, and at the same time provides a convenient means of control. I accomplish these results by mounting on the compressor shaft an impulse turbine or Pelton type of wheel, which is preferably operated by a small hydraulic jet of high velocity. By varying the volume and hence the pressure of the fluid producing this jet, the speed of the compressor may be efficiently controlled through any desired range. As there is no mechanical connection between the rapidly rotating turbine wheel and the driving mechanism, the speed at which the compressor can be operated is only limited by its structural strength.

With this new drive, in situations where simplicity is a prime consideration speed control may be dispensed with, because the power the turbine wheel can transmit is limited, and the compressor will slow up when subjected to overload conditions, as would be the case when the airplane is near the ground and dense air has to be handled.

In the drawings wherein like reference numerals are used to indicate corresponding parts:

Fig. 1 is a cross-sectional view looking down, taken along the section 1—1, Fig. 2;

Fig. 2 is a longitudinal section taken along the lines 2—2, Fig. 1;

Fig. 3 is a section taken along the lines 3—3, Fig. 1, showing the Pelton wheel and hydraulic jet;

Fig. 4 is a section taken along the lines 4—4, Fig. 2, showing the intake to the hydraulic pump and means of obtaining fluid under pressure to lubricate the bearings of the compressor.

Fig. 5 is a section of an impulse turbine or Pelton wheel, taken along the lines 5—5 of Fig. 3;

Fig. 6 is a section through the compressor showing the means of returning the oil from the bearings back to the collecting sump, to which the inlet of the hydraulic pump is connected;

Figure 8:
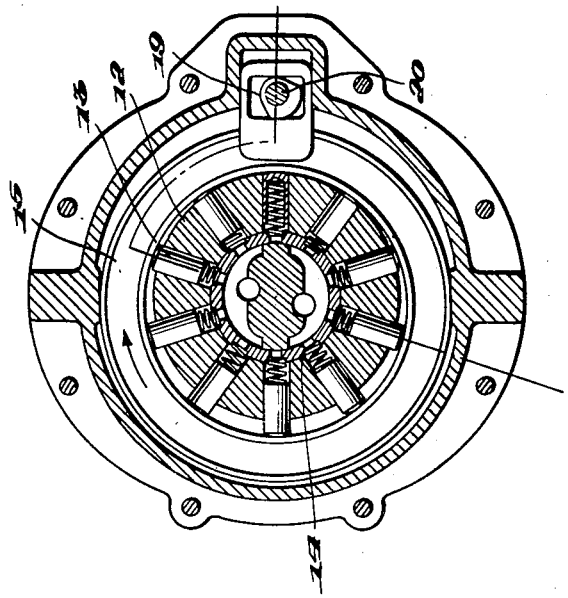
Figure 7:
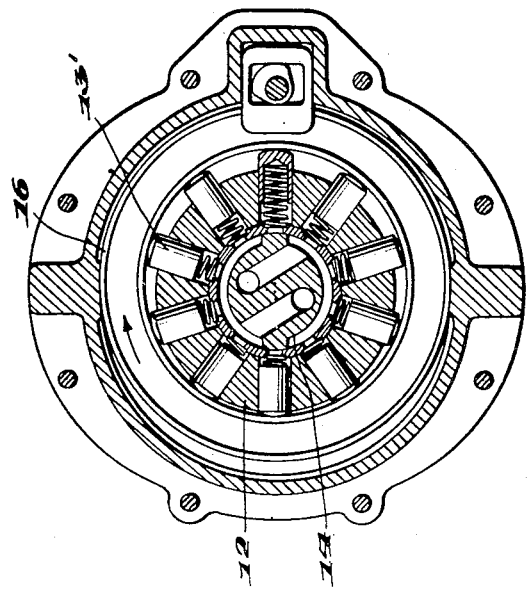

Figs. 7 and 8 are sections through the lines 7—7 and 8—8, respectively of Fig. 2, illustrating the operation of the hydraulic pump; and Fig. 9 is a section taken along the lines 9—9, Fig. 4, showing a detail of the lubrication system.

Referring to the drawings, particularly Fig. 1 and Fig. 2, A is a centrifugal compressor, comprising an impeller 1 running in a close-fitting casing terminating in a volute 2, to which the discharge of the compressor, not shown, is connected. 3 is the inlet of the compressor. The compressor rotor 1 is mounted on a shaft 4 supported by bearing 5 and 6.

B is a hydraulic pump with inlet at 7, discharge at 8 terminating in an orifice or nozzle 9 discharging against a turbine wheel 11, and drive shaft 10. The hydraulic pump may be operated at moderate speed directly from an engine or other prime mover. It is designed to handle hydraulic fluid, usually oil, at high pressure.

The turbine wheel 11 is preferably provided with curved buckets, and is fixed on the shaft 4 of the centrifugal compressor. The high pressure fluid from the hydraulic pump is discharged from the nozzle 9 at high velocity in the form of a jet, which is directed against the curved buckets of the Pelton wheel 11. After leaving the Pelton wheel the oil drains into a sump 27 and is led by a pipe 30, preferably through a cooling device 31, back through the inlet 7 to the hydraulic pump and is again discharged through the nozzle 9.

The hydraulic pump which produces the jet consists of a cylinder block 12 containing a series of close-fitting pistons 13, 13' and 13". The cylinder block 12, which is connected to the shaft 10 by a flange 10', is provided with a fixed lining bushing 23, which journals on a plug 14 with a close-running and joint-forming clearance. The plug 14 is provided with suitable ports, see Figs. 7 and 8, connected to the inlet 7 and outlet 8 of the hydraulic pump, to which the cylinders are alternately connected during each revolution.

The pistons are held against stationary circular rings 15, 16 and 17 by centrifugal force and the springs 18 in the pistons. These rings are set eccentrically to the shaft 10, causing the pistons to reciprocate back and forth in the cylinder block 12 when the block is revolved. The eccentricity of the rings 15, 16 and 17 is controlled by cams 19 mounted on the shaft 20 positioned by the lever 21. By manipulating the lever 21 the eccentricity of the rings 15, 16 and 17, and hence the stroke of the pistons, can be changed from maximum to zero, with a corresponding variation in discharge by the hydraulic pump.

The eccentric position of the ring 16 with respect to shaft 10 is directly opposite to the eccentric offset of the rings 15 and 17. The row of pistons 13 and 13" have a combined area equal to the row of pistons 13', which causes all the rotating parts to be in hydraulic and mechanical balance.

The hydraulic pump B is further described in detail in my co-pending application, Serial No. 521,066. Any other suitable type of hydraulic pump, however, could be used in connection with this invention.

In the accompanying drawings and description the hydraulic pump is combined in one structure with the compressor, but it will be readily understood that this pump could be a separate unit connected by suitable conduits to the compressor, permitting the compressor to be installed at any place in the airplane remote from the source of power.

Bearings 5 and 6 of the compressor are preferably cooled and lubricated by oil from the hydraulic pump obtained as follows: A groove 22 is provided in the plug 14, Figs. 2 and 4, and Fig. 9, so located as to collect a small amount of oil which unavoidably works through the close clearance between the cylinder bushing 23 and the plug 14. This leakage oil is at a much lower pressure than that produced by the hydraulic pump pistons, as it has had to pass through the close clearance between the plug and the rotating cylinder block bushing. This saves the power which would otherwise be wasted if the oil for lubrication were taken at high pressure from the discharge of the hydraulic pump.

Passages 24 conduct the oil from the groove 22 to the bearings 5 and 6. This oil, after passing through the bearing 5, see Fig. 6, goes into the space 25 and thence through the conduit 26 back to the oil sump 27. The oil which passes through the bearing 6 emerges from each end of the bearing, and also falls into the sump 27. All of this lubricating oil mingles in the sump 27 with the oil returning from the Pelton wheel, passes through the cooling device 31 to inlet 7, and is rehandled by the hydraulic pump.

The operation of the device is as follows: Shaft 10 is rotated at moderate speed by any suitable prime mover. The hydraulic pump draws in oil from the sump 27 and raises it to a high pressure in the conduit 8 to which the nozzle 9 is connected. The high pressure oil issues from the nozzle 9 in the form of a high velocity jet which impinges directly against the curved buckets of the turbine wheel 11. This causes the turbine wheel to revolve rapidly and produce power which operates the centrifugal compressor A. The oil, after it has done its work, passes out of the turbine wheel and is collected in the sump 27, is cooled, and returned to the hydraulic pump, and the cycle is repeated.

As there is no mechanical connection between the turbine wheel 11 and the hydraulic pump B, there is no shock at starting, and if the turbine tends to be overloaded it will automatically slow down because the power produced by the turbine wheel 11 is limited to what can be obtained from the jet.

The speed of the compressor, and hence the volume and pressure of the air delivered, may easily be altered by varying the velocity of the jet. This may be accomplished simply and efficiently by changing the capacity of the hydraulic pump, by controlling the stroke of its pistons by means of the lever 21. As the hydraulic pump is discharging through a fixed orifice 9, a change in its capacity means a change in jet velocity, with a corresponding alteration in the performance of the compressor.

Wide fluctuations in speed of the main engine driving the unit can readily be taken care of by providing a hydraulic pump of sufficient oversize to take care of the load when the engine is running at slow speed, and reducing the capacity of this pump per revolution when the engine is running at higher speeds.

Having thus described my invention, what I claim as new and desire to secure by Letters Patent is:

1. In combination, a drive, a pump having bearings, a transmission between said drive and said pump, comprising a hydraulic pump driven from said drive, a hydraulic motor driven by the liquid from said hydraulic pump, and a drive connection between said motor and said first-mentioned pump, and conduit means for continuously diverting part of the liquid at reduced pressure from said hydraulic pump and before it reaches the field of operation of said motor and conducting it along a predetermined course to said first-mentioned pump to lubricate the bearings of said latter pump.

2. In combination, a drive, a pump having bearings, a transmission between said drive and said pump, comprising a hydraulic pump driven from said drive, a hydraulic motor driven by the liquid from said hydraulic pump, and a drive connection between said motor and said first-mentioned pump, and conduit means for continuously conducting along a predetermined course and at reduced pressure to the bearings of said first-mentioned pump at least a part of the liquid leaking past the clearance of said hydraulic pump before said liquid reaches the field of operation of said motor to lubricate said pump bearings.

3. In combination, a drive, a pump having bearings, a transmission between said drive and said pump, comprising a hydraulic pump driven from said drive, a hydraulic motor driven by the liquid from said hydraulic pump, and a drive connection between said motor and said first-mentioned pump, and conduit means for continuously diverting part of the liquid from said hydraulic pump at a section thereof at which the liquid is at a pressure substantially less than the outlet pressure of said hydraulic pump, and before said liquid reaches the field of action of said motor and conducting it along a predetermined course to the bearings of said first-mentioned pump for lubrication purposes.

4. In combination, a drive, a pump having bearings, a transmission between said drive and said pump, comprising a hydraulic pump driven from said drive and adapted to discharge liquid at a pressure substantially greater than the outlet pressure of said first-mentioned pump, a hydraulic motor driven by the liquid from said hydraulic pump, a drive connection between said motor and said first-mentioned pump, and conduit means for continuously diverting part of the liquid from said hydraulic pump at reduced pressure before said liquid reaches the field of operation of said motor and conducting it along a predetermined course to the bearings of said first-mentioned pump to lubricate said bearings.

5. In combination, a drive, a high speed rotary gas pump having bearings, a transmission between said drive and said gas pump, comprising a hydraulic pump driven from said drive and having an outlet pressure substantially greater than the pressure at the outlet of said gas pump, a hydraulic motor separate from said hydraulic pump and driven by the liquid from said hydraulic pump, a drive connection between said motor and said first-mentioned pump, and conduit means for continuously conducting at reduced pressure at least a part of the liquid leaking past the clearance of said hydraulic pump to said first-mentioned pump and before said liquid reaches the field of operation of said motor along a predetermined course to lubricate said latter pump.

6. In combination, a drive, a rotary gas pump having a shaft, a pair of spaced bearings for said shaft, and a rotor on said shaft, a transmission between said drive and said pump comprising a hydraulic pump driven from said drive, a hydraulic motor driven by the liquid from said hydraulic pump, and a drive connection between said motor and said first-mentioned pump, and conduit means for continuously conducting at reduced pressure and along a predetermined course at least a part of the liquid leaking past the clearance of said hydraulic pump to said bearings to lubricate said bearings before said liquid reaches the field of operation of said motor.

7. In a power transmission, the combination comprising an impulse hydraulic turbine adapted to be driven by a high speed hydraulic jet, a member driven by said turbine, a hydraulic pump forming a unit separate from and operable independently of said turbine for creating a high speed hydraulic jet having predetermined dimensions, and having turbine operating kinetic power which is independent of the operation of said turbine, said turbine and said pump being arranged close together in series, a frame mounting said turbine and said pump into a compact unit, conduit nozzle means comprising a short pipe connected to the outlet of said pump and terminating in a nozzle adjacent to said turbine for conveying motive liquid free from valvular restrictions from the outlet of said pump directly towards the field of operation of said turbine and for projecting said liquid as a high speed impulse jet against said turbine, drive means for said pump separate from and operable independently of said turbine and means for selectively varying the output of said pump and thereby the energy of said jet, to vary the speed of said turbine, while maintaining the speed of operation of the input side of said pump substantially constant.

8. In combination, a shaft, a centrifugal gas compressor, a transmission between said shaft and said centrifugal gas compressor, comprising a hydraulic turbine impulse wheel having a mechanical drive connection to said compressor, a hydraulic pump forming a unit separate from and operable independently of said impulse wheel and having a short discharge pipe connected directly to the outlet side of said pump, said pipe terminating at one end in a nozzle in position to discharge a high velocity jet therefrom against said impulse wheel to rotate said wheel, the discharge liquid passing from said pump through said pipe being substantially free from throttling control or digression, whereby substantially the entire liquid discharged from said pump into said pipe is employed solely for the operation of said impulse wheel, said pump being of the rotary variable stroke type having a rotatable cylinder block and a stationary plug on which said block is journalled, said plug being provided with a discharge port to which said discharge pipe is connected and extends from one end lengthwise of said plug, means for varying the stroke of said pump to vary the velocity of said jet while maintaining the speed of the input side of said pump substantially constant, and a frame mounting said compressor, said wheel, said pump and said shaft close together into a compact unit with their axes of rotation substantially parallel.

IRVING C. JENNINGS.

REFERENCES CITED

The following references are of record in the file of this patent:

UNITED STATES PATENTS

| Number | Name | Date |
|---|---|---|
| Re. 21,849 | Schwebs | July 1, 1941 |
| 668,512 | Freitag | Feb. 19, 1901 |
| 876,152 | Douds | Jan. 7, 1908 |
| 1,043,480 | Sundh | Nov. 5, 1912 |
| 1,806,652 | Sperry | May 26, 1931 |
| 1,901,265 | Schneider | Mar. 14, 1933 |
| 2,024,663 | Schrag | Dec. 17, 1935 |
| 2,115,121 | Phillips | Apr. 26, 1938 |
| 2,143,312 | Griswold | Jan. 10, 1939 |
| 2,151,075 | Berger | Mar. 21, 1939 |
| 2,178,864 | Rosenberger | Nov. 7, 1939 |
| 2,186,409 | Ferris | Jan. 9, 1940 |
| 2,194,316 | Messinger | Mar. 19, 1940 |
| 2,223,715 | Berger | Dec. 3, 1940 |
| 2,231,361 | Ferris | Feb. 11, 1941 |
| 2,235,673 | Dodge | Mar. 18, 1941 |
| 2,255,589 | Johnson | Sept. 9, 1941 |
| 2,270,536 | Lenning | Jan. 20, 1942 |
| 2,279,008 | Nathan | Apr. 7, 1942 |
| 2,282,977 | Mast | May 12, 1942 |
| 2,283,644 | Nallinger | May 19, 1942 |
| 2,290,884 | Kollmann | July 28, 1942 |
| 2,341,985 | Green | Feb. 15, 1944 |
| 2,355,357 | Adams | Aug. 8, 1944 |

FOREIGN PATENTS

| Number | Country | Date |
|---|---|---|
| 378,754 | Great Britain | Aug. 18, 1932 |
| 497,779 | Great Britain | 1938 |

Certificate of Correction

Patent No. 2,455,678.

December 7, 1948.

IRVING C. JENNINGS

It is hereby certified that errors appear in the printed specification of the above numbered patent requiring correction as follows:

Column 5, lines 38 and 39, claim 5, strike out the words "along a predetermined course" and insert the same after "pump" and before "to" in line 36, same claim; lines 52 and 53, claim 6, strike out "before said liquid reaches the field of operation of said motor" and insert the same after "bearings" and before "to" in line 51, same claim;

and that the said Letters Patent should be read with these corrections therein that the same may conform to the record of the case in the Patent Office.

Signed and sealed this 5th day of April, A. D. 1949.

[SEAL]

THOMAS F. MURPHY,
*Assistant Commissioner of Patents.*